INVENTORS
LLEWELLYN C. OAKLEY, JR.
THEODORE T. HOUSTON

United States Patent Office 3,218,124
Patented Nov. 16, 1965

3,218,124
PROCESS OF PRODUCING HYDROGEN FLUORIDE AS A DRY GAS FROM CLEAR FLUOSILICIC ACID-CONTAINING SOLUTIONS
Llewellyn C. Oakley, Jr., and Theodore T. Houston, Tampa, Fla., assignors, by mesne assignments, to Tennessee Corporation, New York, N.Y., a corporation of Delaware
Filed Sept. 10, 1962, Ser. No. 222,526
11 Claims. (Cl. 23—153)

The present application is related to co-pending applications of Theodore T. Houston and Gerald E. G. Wilkinson (Serial No. 222,527), of Gerald E. G. Wilkinson (Serial No. 222,447), of Theodore T. Houston (Serial No. 222,443), and of Fred J. Klem (Serial No. 222,424), all of which have been assigned to a common assignee.

The present invention relates to the process of producing hydrogen fluoride as a dry gas from clear fluosilicic acid-containing solutions, and, more particularly, to a process for the manufacture of concentrated hydrofluoric acid and/or anhydrous hydrogen fluoride from fluosilicic acid and/or from a filtered solution containing a mixture of fluosilicic acid and hydrofluoric acid with the production of hydrated silica as a by-product.

It is well known that there have been many methods for the production of hydrofluoric acid and/or anhydrous hydrogen fluoride which have been used or proposed. Most of these prior methods employed fluospar which was calcined with strong sulfuric acid to release hydrogen fluoride and silicon tetrafluoride as gases. When a relatively pure fluospar was employed, the problem of producing fairly pure hydrogen fluoride was not so great, but when a very low-grade fluospar containing substantial quantities of silica was employed, the problem of removing silicon tetrafluoride was substantial and costly. When fluosilicic acid was used as a source of hydrogen fluoride similar problems were involved. In cases where large amounts of silicon tetrafluoride or fluosilicic acid were involved, none of these prior methods have proved to be commercially practicable because they entailed very expensive processing and/or involved high losses. Although attempts were made to overcome the foregoing difficulties and other disadvantages, none, as far as we are aware, was entirely successful when carried into practice commercially on an industrial scale.

It has now been discovered that concentrated hydrofluoric acid and/or substantially pure anhydrous hydrogen fluoride can be produced commercially and simultaneously from fluosilicic acid on an industrial scale by converting substantially all the fluorine in said acid into hydrogen fluoride. Concentrated hydrofluoric acid and/or substantially pure anhydrous hydrogen fluoride can be manufactured from a mixture of hydrofluoric acid and fluosilicic acid which is produced when a very low-grade fluospar has been calcined with strong sulfuric acid and the gases absorbed in water. A mixture of hydrofluoric acid and fluosilicic acid can also be obtained when the fluorine gases from phosphate rock defluorination have been absorbed in water. As phosphate rock contains from 3% to 4% fluorine, it is a source of fluorine, and, when defluorinated substantially all the fluorine can be recovered by the use of the present invention. Likewise, large quantities of phosphate rock are used in the fertilizer business to produce superphosphate and wet process phosphoric acid. In the superphosphate process from about 25% to about 40% of the fluorine in the phosphate rock is evolved as silicon tetrafluoride which is absorbed in water to produce fluosilicic acid. The reactions taking place in water absorption of silicon tetrafluoride may be indicated as follows:

$$3SiF_4 + XH_2O \rightarrow 2H_2SiF_6 + SiO_2 \cdot (X-2)H_2O$$
(Hydrated Silica)
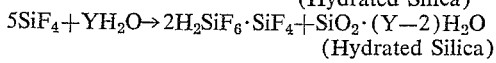
$$5SiF_4 + YH_2O \rightarrow 2H_2SiF_6 \cdot SiF_4 + SiO_2 \cdot (Y-2)H_2O$$
(Hydrated Silica)

Since hydrated silica is a solid and is substantially insoluble, the aforesaid reactions proceed practically to completion.

In the process for manufacturing wet process phosphoric acid, from about 20% to about 50% of the fluorine in the phosphate rock is evolved as gases and recovered as fluosilicic acid. Fluosilicic acid is also obtained when it is desired to manufacture valuable products such as, sodium fluoride, potassium fluoride, and calcium fluoride by calcining the fluosilicates of sodium, potassium and calcium. The calcination releases silicon tetrafluoride as a gas which is absorbed in water to produce fluosilicic acid.

It is an object of the present invention to provide an improved process capable of converting substantially all of the fluorine in fluosilicic acid to hydrogen fluoride while producing hydrated silica as a by-product.

Another object of the invention is to provide an improved process of producing hydrogen fluoride which involves the treatment of a mixture of fluosilicic acid and hydrofluoric acid and the conversion of substantially all of the fluorine into hydrogen fluoride.

The invention also contemplates providing an improved process for the production of hydrogen fluoride and the simultaneous production of valuable hydrated silica as a by-product which is removed by filtration, etc.

The invention further contemplates providing an improved process of producing hydrogen fluoride by converting the fluorine into hydrogen fluoride obtained from fluosilicic acid now being produced in large quantities as a by-product in the production of superphosphate.

It is likewise within the contemplation of the invention to provide an improved process for manufacturing hydrogen fluoride involving the use of strong contact process sulfuric acid to dehydrate a clear solution containing fluosilicic acid and to decompose the fluosilicic acid into its dry component gases while at the same time obtaining satisfactory dilution of sulfuric acid for use in the acidulation processes for the production of superphosphate.

It is also the purpose of the invention to provide an improved process of manufacturing hydrogen fluoride involving the retention of phosphatic values contained in fluosilicic acid as impurities in the sulfuric acid treating solution and the eventual recovery in superphosphate produced with said sulfuric acid.

Other objects and advantages will become apparent from the following description taken in conjunction with the accompanying drawings, in which.

Generally speaking, the present invention contemplates the dehydration and decomposition of the fluosilicic acid into essentially dry hydrogen fluoride and silicon tetrafluoride. The reactions involved may be indicated by the following equations:

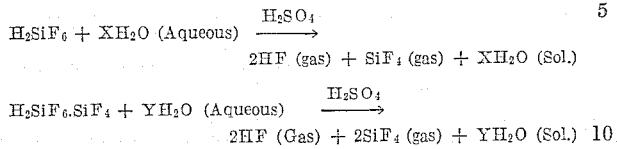

$$H_2SiF_6 + XH_2O \text{ (Aqueous)} \xrightarrow{H_2SO_4} 2HF \text{ (gas)} + SiF_4 \text{ (gas)} + XH_2O \text{ (Sol.)}$$

$$H_2SiF_6 \cdot SiF_4 + YH_2O \text{ (Aqueous)} \xrightarrow{H_2SO_4} 2HF \text{ (Gas)} + 2SiF_4 \text{ (gas)} + YH_2O \text{ (Sol.)}$$

The present invention involves the discovery that when aqueous fluosilicic acid and concentrated sulfuric acid are mixed, hydrogen fluoride is evolved essentially as a dry gas and simultaneously silicon tetrafluoride is likewise evolved. By conducting the reaction in the absence of free silica, a minimum amount of $SiF_4$ is produced.

The rates at which the gases are evolved are dependent primarily on two factors: (I) The surface area available for the release of the gases; and (II) the relative affinity of the sulfuric acid treating solution for hydrogen fluoride and silicon tetrafluoride gases. In the case of the first of these two factors, the larger the surface area for a given volume of solution, the more rapid is the release of the gases, whereas in the case of the second of these factors, three variables of primary importance are involved. These variables are:

(1) The temperature of the sulfuric acid solution containing the gases;
(2) The terminal concentration of the sulfuric acid containing the gases;
(3) The concentration of the fluorine containing gases in the vapor phase in contact with the sulfuric acid solution.

It has been found that the higher the temperature, the more rapid is the evolution of gases; the higher the concentration of the sulfuric acid solution, the more rapid is the evolution of the gases; and the lower the concentration in the gas phase, the more rapid is the evolution of the fluorine gases.

While the complete theoretical explanation of the entire mechanism of the reactions on which the improved process is based has not been fully formulated, nevertheless the improved process has been satisfactory in operation and has produced successful results. However, certain scientific and technical facts have been discovered which assisted in the making of the invention. Some of these facts have been embodied in curves which are illustrated in FIGS. 2 to 5.

Figure 2:
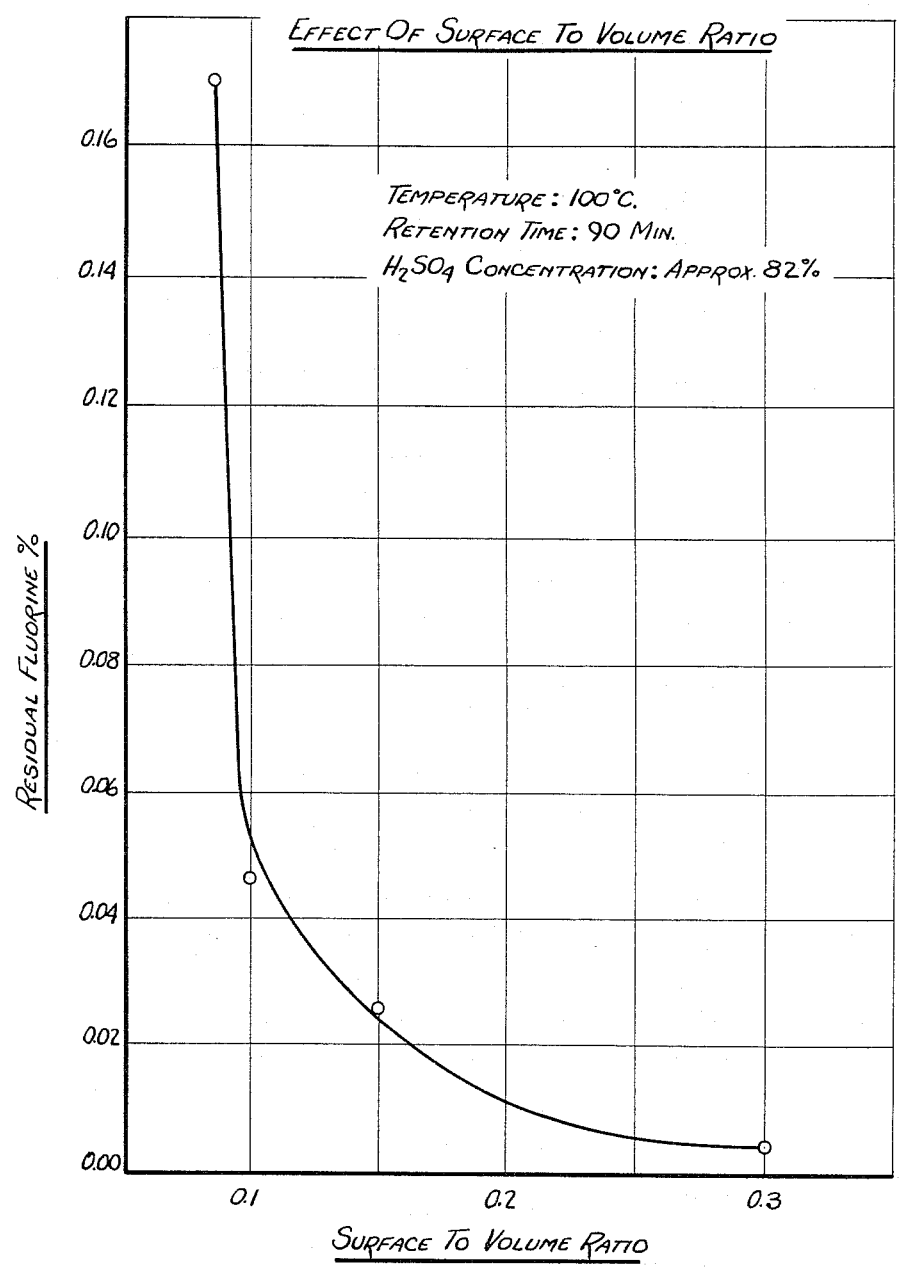
FIG. 2 depicts a curve showing the effect of surface-to-volume ratio of the reacting vessel.

In FIG. 2 a curve is depicted which shows the effect of surface to volume ratio on the residual fluorine content of a sulfuric acid-fluosilicic acid mixture. To obtain the data upon which this curve is based, an experiment was performed as follows: Four agitated vessels of the same size and shape were placed in a constant temperature bath maintained at 100° C. (212° F.). Fluosilicic acid of about 8% concentration (1 part) and sulfuric acid of about 93% concentration (6.85 parts) were heated and mixed to produce a mixture having a final concentration of about 82% sulfuric acid. This mixture was quickly added to the vessels in the bath, filling each to a different level. After 90 minutes the material in each vessel was analyzed for fluorine.

The surface-to-volume ratio for each vessel was determined by dividing the exposed surface area in each vessel by the volume of liquid it contained. For example, using vessels having a surface area of 30 square centimeters, that vessel to which 100 cc. was added would have a surface-to-volume ratio of 0.3; that to which 300 cc. was added would have a surface-to-volume ratio of 0.1; etc. The residual fluorine content of the sulfuric acid solution is plotted in percent as ordinate and the surface-to-volume ratio as abscissa. This curve illustrates the importance of exposed surface in facilitating the liberation of the fluorine-containing gases from the sulfuric acid-fluosilicic acid mixture. For example, for the conditions under which the test was made, the residual fluorine content of the mixture was about 0.15% when the surface-to-volume ratio was about 0.08, while it was only 0.01% when the ratio was 0.3.

Figure 3:
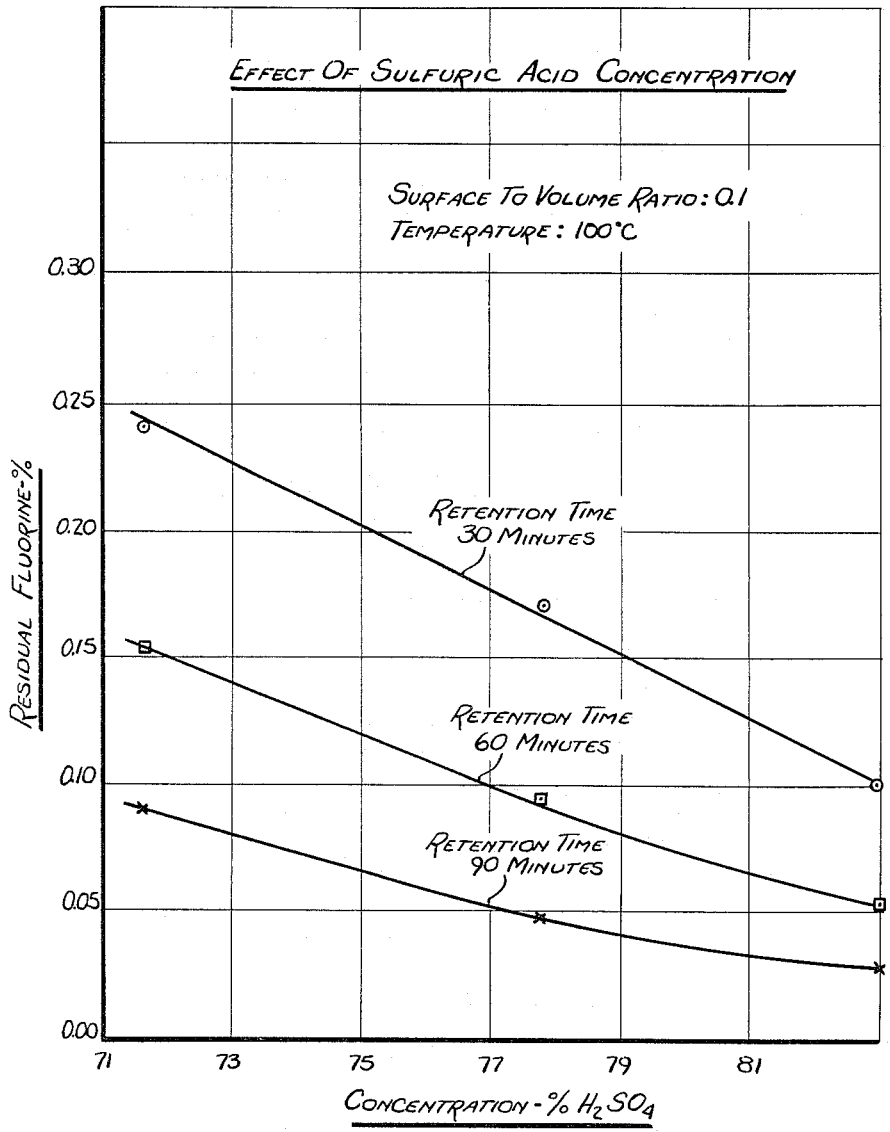
FIG. 3 shows a curve illustrating the effect of sulfuric acid concentration on the residual fluorine in the raw material.

A second group of tests was performed to obtain the data presented in FIG. 3. In this case, the same vessel was filled to the same level for each test, thus keeping the surface-to-volume ratio constant. Temperature was maintained at 100° C. (212° F.). Three different mixtures of sulfuric acid and fluosilicic acid were prepared varying the ratio of fluosilicic acid to sulfuric acid so as to yield three different terminal sulfuric acid concentrations between 71% and 83% sulfuric acid. In each case, the mixture was sampled and analyzed for fluorine after the passage of 30, 60, and 90 minutes. FIG. 3 is a series of curves resulting from plotting the residual fluorine content of the solutions expressed in percent as ordinate against terminal sulfuric acid concentration expressed in percent as abscissa.

The figure illustrates the effect of increasing the terminal sulfuric acid concentration over the range from about 71% to about 83% on the residual fluorine content of the mixed acid. It is apparent that a 10% increase in the terminal sulfuric acid content over the range investigated reduces the residual fluorine content in said terminal sulfuric acid by a factor of about 50% at all retention times investigated.

Figure 4:
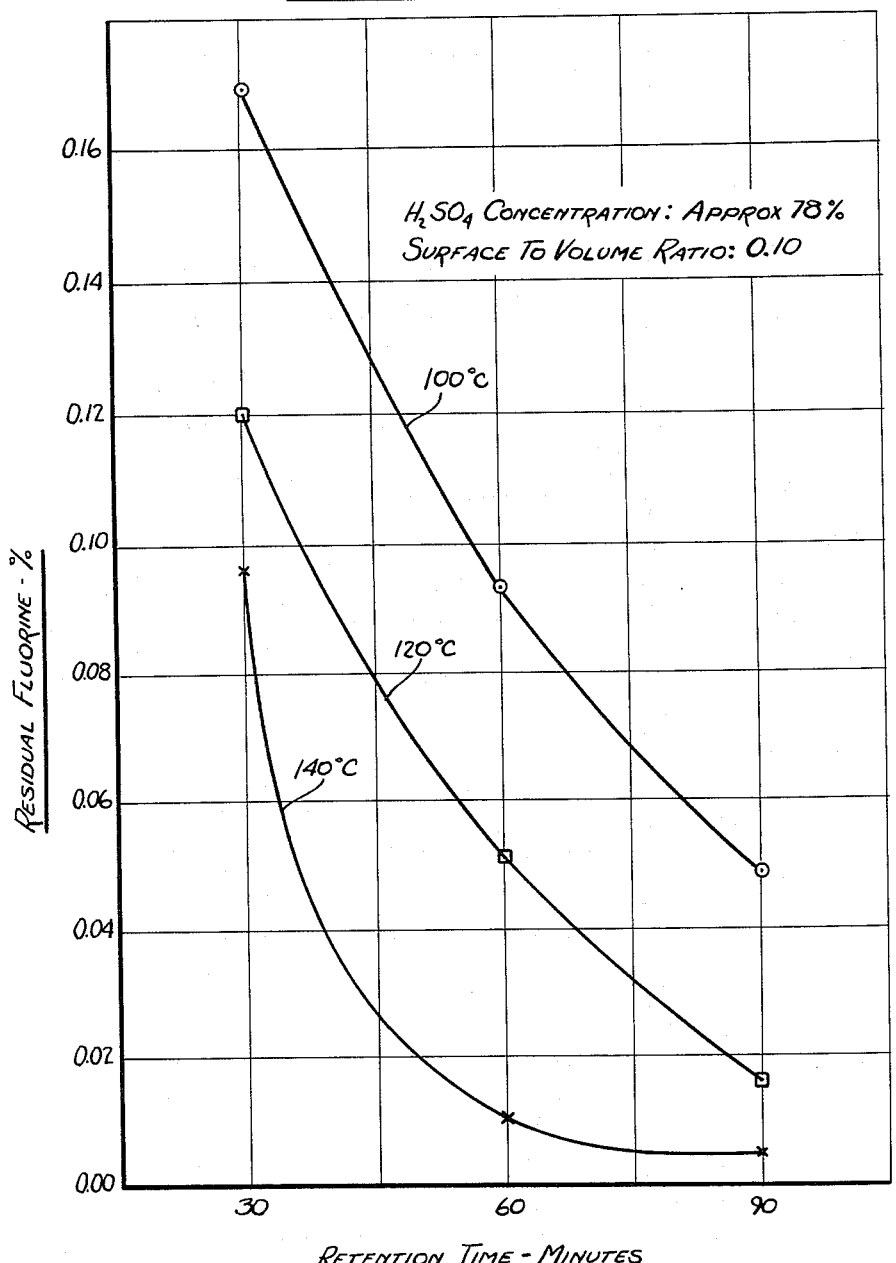
FIG. 4 is a series of curves showing the effect of retention time on the residual fluorine in the raw material for several temperatures.
Figure 5:
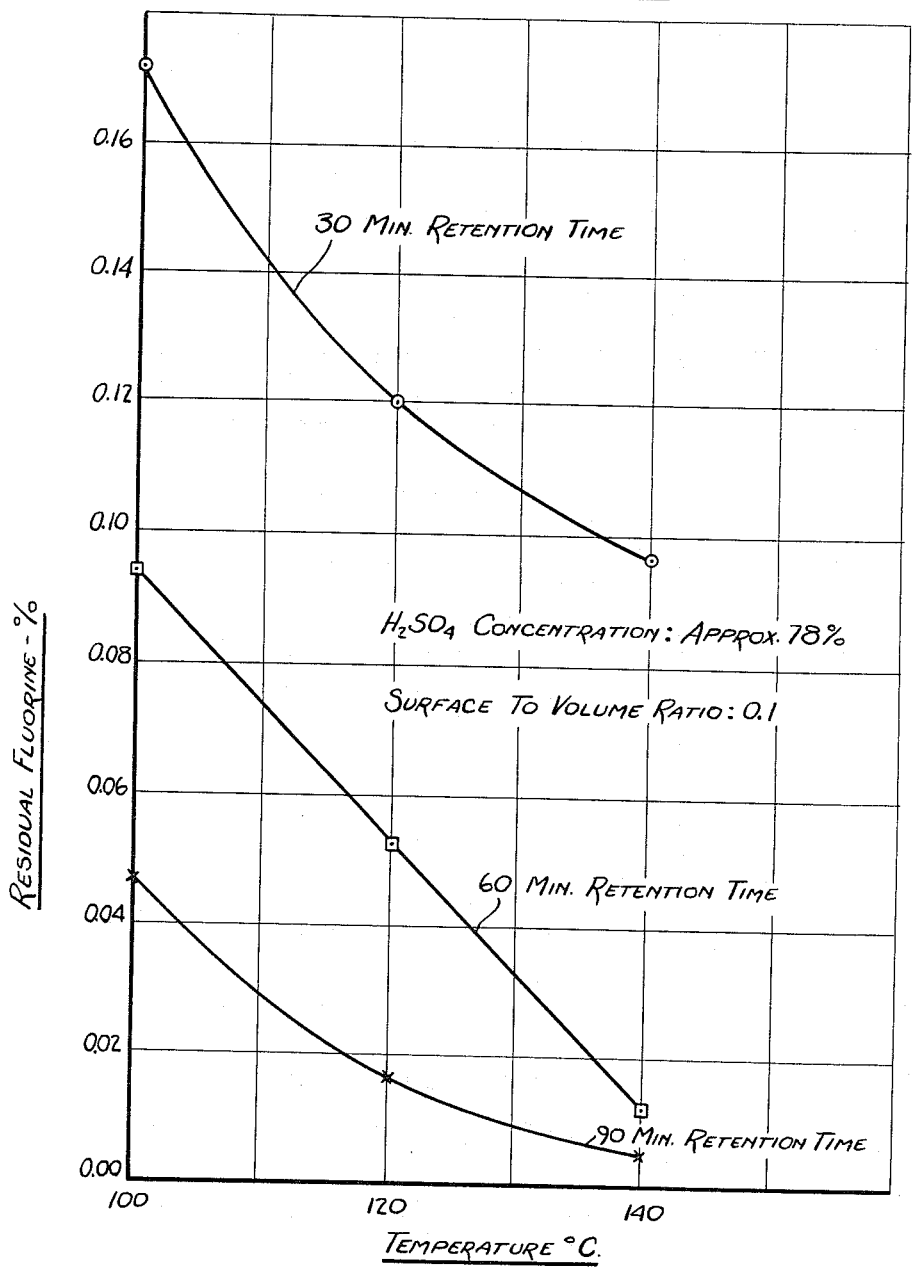
FIG. 5 depicts a curve showing the relation of temperature and residual fluorine in the raw material for several retention times.

A third group of tests was made to obtain the data utilized in preparing FIGURES 4 and 5. A mixture of fluosilicic acid and sulfuric acid was prepared to yield a terminal concentration at approximately 78% sulfuric acid. The mixture was immediately transferred to three vessels in such quantities that the surface-to-volume ratio for each vessel was made constant at 0.1. One vessel was in a 100° C. (212° F.) constant temperature bath, one in a 120° C. (248° F.) bath, and one in a 140° C. (284° F.) bath. Each vessel was sampled and analyzed for fluorine after the passage of 30, 60, and 90 minutes. From these tests, data were obtained for construction of FIGURE 4 and FIGURE 5. In FIGURE 4 residual fluorine in the sulfuric acid expressed in percent is plotted as ordinate against retention time in minutes as abscissa. A series of three curves were plotted, one for each temperature. In FIGURE 5 the same ordinate (residual fluorine in percent) as in FIGURE 4 is used. However, in this case, temperature in degrees centigrade was selected as abscissa. In this case, a series of three curves was plotted, one for each retention time.

FIGURE 4 illustrates the manner in which the residual fluorine content of the sulfuric acid solution decreases with time. At 100° C. (212° F.), it decreases from about 0.17% (30 minutes after mixing) to about 0.05% (90 minutes after mixing). At 120° C. (248° F.), the decrease over the same time period is from about 0.12% to about 0.02%, and at 140° C. (284° F.) the decrease is from about 0.09% to about 0.005% for the time interval.

FIGURE 5 illustrates the manner in which the residual fluorine content of the sulfuric acid solution decreases with increases in the temperature of the solution. It was found that the residual fluorine content after the passage of 30 minutes from the time of mixing was about 0.17% when the temperature was maintained at 100° C. (212° F.), and about 0.10% when it was maintained at 140° C. (284° F.). After one hour, the values were about 0.09% and about 0.01%, respectively, and after 90 minutes about 0.05% and about 0.005%.

From the foregoing description, it is obvious to one skilled in the art that an almost limitless combination of operating conditions as to temperature, reaction time, terminal sulfuric acid concentration, and surface area available for evolution of gases can be employed to carry the invention into practice. Certain practical conditions, however, require preferred operating ranges. Concentrations of fluosilicic acid and sulfuric acid will be determined by the raw materials available. Concentration of the terminal sulfuric acid must not be lower than that required of the subsequent use. Temperature and retention time are interrelated in such a manner that the cost of smaller equipment for the liberation of the fluorine-containing gases at higher temperatures must be balanced against the cost of heating the raw materials to these temperatures. Surface area is limited by the type of packing used in the equipment in which the fluorine-containing gases are liberated. In general, the preferred operating ranges of the present invention are as follows:

(1) Terminal sulfuric acid concentration is between about 65% $H_2SO_4$ and about 98% $H_2SO_4$.

(2) Temperature is between about 200° F. (93° C.) and about 400° F. (204° C.).

(3) Retention time has as its lower limit the flooding rate of the column used whereas the practical retention time will depend on the conditions of terminal sulfuric acid concentration and the temperature selected.

(4) Surface-to-volume ratio is that provided by conventional packing.

By considering the examples which are set forth hereinafter in the specification, one skilled in the art will be able to adapt the present invention to the particular requirements of the situation.

Figure 1:
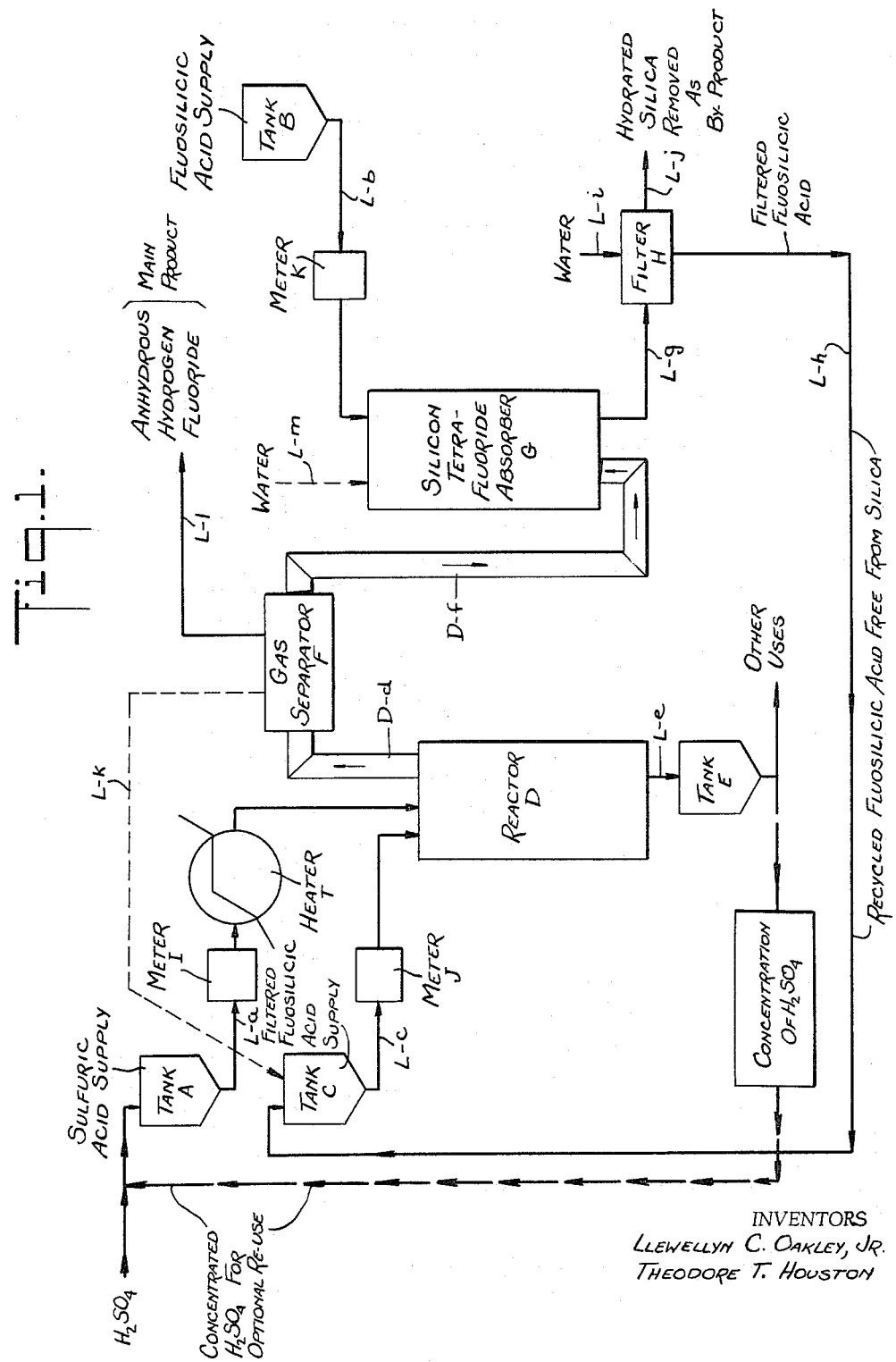
FIG. 1 is a flow sheet of the improved process carrying the present invention into practice.

In carrying the invention into practice, it is preferred to utilize the operations and the equipment illustrated in FIG. 1.

A supply of concentrated sulfuric acid is provided in tank "A" and a supply of a clear or filtered aqueous solution containing fluosilicic acid is provided in tank "C." Such a solution is substantially free from or devoid of silica. The concentrated sulfuric acid flows through line "L–a" to meter "I" where the amount of acid is measured and is controlled. From the meter, the measured acid goes to heater "T" where it is heated to a selected and controlled temperature. Materials of construction in this part of the equipment can be those conventionally used in the art to handle the strength of sulfuric acid employed. The heated acid flows to reactor "D" for the treatment of fluosilicic acid fed through line "L–c" and meter "J" which are lined with rubber or plastic.

Reactor "D" is a graphite or fluorocarbon lined vessel and contains aqueous fluosilicic acid which is dehydrated by the concentrated sulfuric acid. In the treatment, the sulfuric acid is diluted by the water of the fluosilicic acid and leaves through line "L–e" to tank "E." From this tank, it can be concentrated for re-use in the process and is then recycled to tank "A." Instead of being recycled, the diluted sulfuric acid can be utilized in other processes, such as the treatment of phosphate rock to make superphosphate. When the acid is so used, the dilution must be appropriate to the use.

Hydrogen fluoride and silicon tetrafluoride gases formed simultaneously by the decomposition of fluosilicic acid leave the reactor via duct "D–d" and go to gas separator "F." In the gas separator "F," the substantially dry mixture of hydrogen fluoride and silicon tetrafluoride can be separated in any suitable manner well known to those skilled in the art. For instance, such operations include but are not limited to distillation, adsorption of hydrogen fluoride in cold sulfuric acid, or adsorption of hydrogen fluoride in cold fluosulfonic acid. In the event that the gas separation utilized yields a by-product of impure hydrogen fluoride, such a by-product may be recycled via line "L–k" to the tank "C" where it is incorporated in aqueous fluosilicic acid.

Anhydrous hydrogen fluoride leaves the gas separator "F" via line "L–l" to storage or utilization. Silicon tetrafluoride gas leaves gas separator "F" and goes via duct "D–f" to an absorber "G" for silicon tetrafluoride.

Aqueous fluosilicic acid is supplied from plastic or rubber lined tank "B." The fluosilicic acid thus supplied flows to meter "K" via line "L–b" and then to absorber "G," all of which have plastic or rubber lined construction. When the supply of fluosilicic acid is too concentrated for efficient absorption of silicon tetrafluoride, additional water may be added as optionally desired to absorber "G" via line "L–m." In the absorber, silicon tetrafluoride reacts with water under suitable conditions to form fluosilicic acid and silica. The slurry of silica and fluosilicic acid flows via line "L–g" to rubber covered filter "H" where silica is removed by filtration or by other appropriate operation and washed with water supplied by line "L–i." The clear and filtered fluosilicic acid flows via line "L–h" and is recycled to tank "C." Silica, which is hydrated, is removed via conveyor "L–j" for use as a by-product or for further purifying operations, etc. An alternative method of operation is to introduce the filtered fluosilicic acid to the process in tank "C" and use water only through line "L–m" to the silicon tetrafluoride absorber "G." In this case, a pure fluosilicic acid is produced and may be withdrawn from line "L–h" for sale or utilization.

It will thus be observed that when the improved process embodying the present invention is carried into practice, strong sulfuric acid and clear, aqueous fluosilicic acid are mixed together in a reactor. The retention time, terminal concentration of the sulfuric acid, temperature, and surface area to volume ratio are so controlled as to dehydrate fluosilicic acid and then to decompose the thus-dehydrated fluosilicic acid into essentially dry hydrogen fluoride and silicon tetrafluoride gases. Such gases are evolved from the sulfuric acid solution in the reactor.

For the purpose of giving those skilled in the art a better understanding of the invention and/or a better appreciation of the advantages of the invention, the following illustrative examples are given:

EXAMPLE I

Example I illustrates how the invention may be applied to the conversion of weak fluosilicic acid, produced as a by-product in the manufacture of superphosphate, into substantially dry hydrogen fluoride and silicon tetrafluoride gases. At the same time concentrated sulfuric acid as produced by the contact process is diluted to a more suitable concentration for superphosphate manufacture.

Equipment used in this example includes a stirred reaction vessel suitably equipped to maintain a constant temperature and an apparatus for separation of the substantially dry hydrogen fluoride and silicon tetrafluoride as well as interconnecting duct work and the like.

To the reaction vessel was added about 500 grams of 10% fluosilicic acid ($H_2SiF_6 \cdot SiF_4$) and about 1715 grams of 98.5% sulfuric acid. The reaction is conducted in the absence of silica. The shape of the vessel was such that the addition of these materials resulted in a surface-to-volume ratio of about 0.1. The temperature of the vessel was maintained at about 140° C. (284° F.) for about 90 minutes and all of the liberated gases were conducted to the separation apparatus. The gas was separated and the amount of each component measured. The quantity of silicon tetrafluoride ($SiF_4$) recovered was about 42 grams while the quantity of hydrogen fluoride (HF) was about 7.9 grams. The residual sulfuric acid had a terminal concentration of about 80% $H_2SO_4$ and contained about 0.005% of fluorine. The $SiF_4$ was absorbed in an aqueous solution of fluosilicic acid. In the solution, $SiF_4$ reacted with water to produce more fluosilicic acid and silica. Such silica is removed as a by-product by filtration, etc. The clear, filtered fluosilicic acid is recycled for further treatment with concentrated sulfuric acid for the production of hydrogen fluoride as the main product.

EXAMPLE II

Example II illustrates how the invention may be applied to the conversion of weak fluosilicic acid, produced as a by-product in the manufacture of superphosphate, into substantially dry hydrogen fluoride and silicon tetrafluoride gases. At the same time, concentrated sulfuric acid as produced by the well-known contact process is diluted to a more suitable concentration for superphosphate manufacture. The operations were conducted in a manner similar to Example I.

Equipment used in this example included a stirred reaction vessel suitably equipped to maintain a constant temperature and an apparatus for separation of the substantially dry hydrogen fluoride and silicon tetrafluoride as well as interconnecting duct work and the like.

To the reaction vessel were added about 500 grams of 10% fluosilicic acid ($H_2SiF_6 \cdot SiF_4$) substantially devoid of silica and about 1715 grams of 98.5% sulfuric acid. The shape of the vessel was such that the addition of these materials resulted in a surface-to-volume ratio of about 0.1. The temperature of the vessel was maintained at about 140° C. (284° F.) for about 60 minutes and all of the liberated gases were conducted to the separation apparatus. The gas was separated and the amount of each component measured. The quantity of silicon tetrafluoride ($SiF_4$) recovered was 42 grams while the quantity of hydrogen fluoride (HF) was about 7.8 grams. The residual sulfuric acid had a terminal concentration of about 80% $H_2SO_4$ and contained about 0.012% of fluorine.

EXAMPLE III

Example III also illustrates how the invention may be applied to the conversion of weak fluosilicic acid, produced as a by-product in the manufacture of superphosphate, into substantially dry hydrogen fluoride and silicon tetrafluoride gases. At the same time, concentrated sulfuric acid as produced by the conventional contact process is diluted to a more suitable concentration for superphosphate manufacture. The operations were conducted in a manner similar to Example I.

Equipment used in this example includes a stirred reaction vessel suitably equipped to maintain a constant temperature and an apparatus for separation of the substantially dry hydrogen fluoride and silicon tetrafluoride as well as interconnecting duct work and the like.

To the reaction vessel were added about 500 grams of 10% fluosilicic acid ($H_2SiF_6 \cdot SiF_4$) substantially free of silica and about 1715 grams of 98.5% sulfuric acid. The shape of the vessel was such that the addition of these materials resulted in a surface-to-volume ratio of about 0.1. The temperature of the vessel was maintained at about 120° C. (248° F.) for about 90 minutes and all of the liberated gases were conducted to the separation apparatus. The gas was separated and the amount of each component measured. The quantity of silicon tetrafluoride ($SiF_4$) recovered was about 42 grams while the quantity of hydrogen fluoride (HF) was about 7.6 grams. The residual sulfuric acid had a terminal concentration of about 80% $H_2SO_4$ and contained about 0.017% of fluorine.

EXAMPLE IV

Example IV illustrates how the invention may be applied to convert the impure weak fluosilicic acid produced as a by-product in the manufacture of wet process phosphoric acid into purified fluosilicic acid and hydrogen fluoride.

The equipment is identical to that of the previous examples except that the silicon tetrafluoride vapors were bubbled through an absorption tower. The slurry obtained therein was filtered and the washings combined with the fluosilicic acid. The operations were conducted in a manner similar to Example I.

To the reaction vessel were added about 500 grams of 15% fluosilicic acid ($H_2SiF_6$) and about 1617 grams of 98.5% $H_2SO_4$. The reaction was conducted in the absence of silica and was effective to evolve vapors of hydrogen fluoride and the simultaneous evolution of vapors of silicon tetrafluoride. The vapors evolved passed through the gas separator collecting the hydrogen fluoride and introducing the silicon tetrafluoride into an absorption tower containing about 150 grams of water. The reaction vessel was maintained at about 140° C. (284° F.) for about 90 minutes. The residual sulfuric acid at this time analyzed about 78% $H_2SO_4$ and contained about 0.005% of fluorine. This acid was suitable for production of wet process phosphoric acid. The hydrogen fluoride collected from the separator weighed about 20.7 grams. The slurry collected in the absorption tower was filtered and the cake washed with about 5 grams of water which was combined with the filtrate. The combined filtrate and washings constituted a clear, filtered solution of fluosilicic acid which weighed about 194 grams and analyzed 21.5% $H_2SiF_6$. The cake was oven dried and weighed about 5 grams.

EXAMPLE V

Example V will illustrate a method of employing the invention to convert substantially all of the fluorine values of fluosilicic acid to hydrogen fluoride. In this example, a stirred vessel was used as the reactor with a surface volume ratio of about 0.1. The temperature of treatment was controlled at about 140° C. (284° F.). A retention time of about 90 minutes was required to evolve substantially all the fluorine in the fluosilicic acid. A suitable quantity of sulfuric acid, such as about 4430 pounds of 98.5% $H_2SO_4$, was caused to flow from supply tank "A" via line "L–a" through meter "I" and heater "T" to reactor "D." A supply of filtered aqueous fluosilicic acid, such as about 1586 pounds of 25% $H_2SiF_6$ containing about 5 pounds of HF, was flowed from supply tank "C" through line "L–c" to and through meter "J" and then to reactor "D."

Preheating of the sulfuric acid in heater "T" and heat of dilution in the reactor "D" raises the temperature of the solution to about 140° C. (284° F.). The terminal concentration of the sulfuric acid in reactor "D" is diluted to about 60° Bé. (about 77.67% $H_2SO_4$) by water in the aqueous fluosilicic acid. By controlling the temperature to about 140° C. (284° F.), the terminal concentration to about 77.67% sulfuric acid, and the surface-to-volume ratio to about 0.10 and a retention time of about 90 minutes, dehydration and decomposition of the fluosilicic acid is effected and evolution of the hydrogen fluoride and silicon tetrafluoride gases results from such dehydration and decomposition.

The diluted sulfuric acid is discharged from reactor "D" and goes to storage tank "E." Such dilute sulfuric acid has a strength of about 60° Bé. and can be concentrated for re-use in the process and can be recycled to tank "A." Alternatively, the dilute acid can be diverted for acidulation purposes in the making of superphosphate from phosphate rock as it has the proper dilution and concentration. The fluorine gases comprising about 115.3 pounds of hydrogen fluoride, about 286.7 pounds of silicon tetrafluoride, and about 1 pound of water vapor are exited from reactor "D" through duct "D–d" into gas separator "F." This separator can be any of the well-known types and can operate in a manner familiar to those skilled in the art to separate hydrogen fluoride and silicon tetrafluoride.

From the gas separator "F," about 100 pounds of anhydrous hydrogen fluoride leaves via line "L–l" to storage or for direct utilization. About 286 pounds of silicon tetrafluoride are produced along with about 10 pounds of hydrogen fluoride and leave the gas separator "F" via duct "D–f" to the silicon tetrafluoride absorber "G." In this absorber, silicon tetrafluoride is absorbed by about 625 pounds of 20% fluosilicic acid ($H_2SiF_6$). This acid comes from fluosilicic acid supply in tank "B" via line "L–b" through meter "K." About 713 pounds of water is added through inlet "L–m" to the absorbing tower "G."

From the absorber "G," the slurry, which comprises about 1584 pounds of about 25.3% $H_2SiF_6$ and about 50 pounds of silica, is discharged by line "L–g" onto filter "H" where the silica is removed and then washed with about 50 pounds of water. The silica with about 45 pounds of water and about 5 pounds of $H_2SiF_6$ is discharged from filter "H" via line "L–j." From filter "H,"

the fluosilicic acid (about 1584 pounds of 25% $H_2SiF_6$) is recycled and flows via line "L–h" back to supply tank "C." Impure hydrofluoric acid comprising about 5 pounds of HF, about 1 pound of $H_2SiF_6$, and about 1 pound of water is recycled and flows from separator "F" via line "L–k" to the fluosilicic acid supply tank "C."

In the following examples an insufficient portion of the fluorine was liberated for the practical application of the process. They are included to illustrate to those skilled in the art the boundary conditions below which the process is impractical.

EXAMPLE VI

Using an open platinum beaker 3½″ diameter equipped with a plastic agitator, 100 ml. of 98% $H_2SO_4$ was added to 100 ml. of 30% $H_2SiF_6$. This mixture would have a fluorine content of 230 g./liter, if there was no evolution of fluorine. The mixture was sampled as soon as addition of the sulfuric acid was complete. It was then held with agitation at room temperature (about 25° C., 77° F.) and samples after the passage of 15, 30, 45, and 60 minutes.

The quantity in the beaker was determined and the samples were analyzed. The results are set forth in the following table:

Table

| Time, Minutes | Fluorine Content, g./l. | Fluorine Evolved, Percent |
|---|---|---|
| 0 | 220 | 11.4 |
| 15 | 206 | 16.1 |
| 30 | 208 | 15.8 |
| 45 | 182 | 26.4 |
| 60 | 192 | 23.9 |

The terminal sulfuric acid concentration in this test was about 52% $H_2SO_4$. It is apparent that neither the terminal sulfuric acid concentration nor the temperature was sufficiently high to give practical results.

EXAMPLE VII

The foregoing test was repeated and only the beaker was maintained at 60° C. (140° F.). The results are set forth in the following table:

Table

| Time, Minutes | Fluorine Content, g./l. | Fluorine Evolved, Percent |
|---|---|---|
| 0 | 188 | 26.5 |
| 15 | 152 | 40.5 |
| 30 | 148 | 43.0 |
| 45 | 130 | 47.7 |
| 60 | 106 | 56.9 |

It is apparent that conditions were inadequate for practical liberation of the fluorine.

EXAMPLE VIII

The test was repeated again. In this test, the beaker was maintained at 90° C. (194° F.). The results are set forth in the following table:

Table

| Time, Minutes | Fluorine Content, g./l. | Fluorine Evolved, Percent |
|---|---|---|
| 0 | 106 | 55.5 |
| 15 | 92 | 68.3 |
| 30 | 68 | 77.2 |
| 45 | 52 | 82.3 |
| 60 | 28 | 88.4 |

It is to be noted that in this test the terminal sulfuric acid concentration was 61% $H_2SO_4$. One skilled in the art can understand from the foregoing results that satisfactory conditions were almost achieved. Slightly higher temperature and/or slightly higher terminal sulfuric acid concentration and/or slightly longer retention time would have been sufficient for substantially complete liberation of the fluorine for practical purposes. Those skilled in the art will appreciate that the proper selection of temperature, terminal sulfuric acid concentration and/or retention time in accordance with the present invention as set forth more fully hereinbefore will produce practical results.

Although the present invention has been described in conjunction with preferred embodiments, it is to be understood that modifications and variations may be resorted to without departing from the spirit and scope of the invention, as those skilled in the art will readily understand. For instance, the novel process is operable even though some free silica may be present. In general, the presence of minor and/or small amounts of silica can be tolerated. Such modifications and variations are considered to be within the purview and scope of the invention and appended claims.

We claim:

1. In the process of producing hydrogen fluoride as a dry vapor from clear fluosilicic acid-containing solutions, the improvement which comprises subjecting a clear fluosilicic acid-containing solution to the action of heated concentrated sulfuric acid in a closed reactor in the absence of free silica, continuing said action until a substantial portion of hydrogen fluoride is evolved from said solution as a vapor together with silicon tetrafluoride vapor, withdrawing said vapors containing said hydrogen fluoride and silicon tetrafluoride from said closed reactor, separating hydrogen fluoride in said vapors from silicon tetrafluoride whereby hydrogen fluoride is produced as a substantially dry vapor, reacting silicon tetrafluoride with water to produce fluosilicic acid and silica, removing silica and liberating clear fluosilicic acid substantially free from silica, and recycling clear fluosilicic acid substantially free from silica to the first operation.

2. The improved process set forth in claim 1 in which the strength of the concentrated sulfuric acid is controlled sufficiently high to maintain a high terminal concentration of sulfuric acid to effect a rapid evolution of vapors containing hydrogen fluoride.

3. The improved process set forth in claim 1 in which the concentration of the concentrated sulfuric acid in the treated solution is controlled sufficiently high to assure a terminal concentration between about 65% $H_2SO_4$ and about 98% $H_2SO_4$ thereby effectively causing the rapid evolution of vapors.

4. The improved process set forth in claim 1 in which the temperature of the solution is controlled sufficiently high to effect a rapid evolution of vapors containing hydrogen fluoride.

5. The improved process set forth in claim 1 in which the temperature of the solution is controlled between about 200° F. (93° C.) and about 400° F. (204° C.) to assist in causing the rapid evolution of vapors containing hydrogen fluoride.

6. The improved process set forth in claim 1 in which the separated silicon tetrafluoride is reacted with water to produce fluosilicic acid and silica and the silica is removed to produce clear fluosilicic acid which can be used in the first operation of the improved process.

7. The improved process set forth in claim 1 in which the separated silicon tetrafluoride is treated with water to form a solution containing fluosilicic acid and precipitated hydrated silica and the silica is removed to provide a clear solution of fluosilicic acid substantially devoid of free silica which can be recycled to the first operation in the improved process.

8. The improved process set forth in claim 1 in which the surface-to-volume ratio between the surface of said reactor and the volume of said solution is adjusted to be effective to cause the rapid evolution of said vapors containing hydrogen fluoride.

9. The improved process set forth in claim 1 in which the action between the solution and the concentrated sulfuric acid is continued for a period of time sufficiently long to cause the effective evolution of vapors containing hydrogen fluoride.

10. The improved process set forth in claim 1 in which the action between the solution and the concentrated sulfuric acid is continued for a period of time sufficiently long and at least about 90 minutes to cause the effective evolution of vapors containing hydrogen fluoride.

11. The improved process set forth in claim 1 in which the relatively large body of solution containing concentrated sulfuric acid is maintained in the reactor and a stream of aqueous solution containing fluosilicic acid substantially devoid of free silica is flowed into said large body whereby the aqueous fluosilicic acid is dehydrated and fluosilicic acid is decomposed into its dry component vapors consisting essentially of silicon tetrafluoride and hydrogen fluoride.

References Cited by the Examiner
UNITED STATES PATENTS

| | | | |
|---|---|---|---|
| 465,607 | 12/1891 | Beylikgy | 23—153 |
| 1,297,464 | 3/1919 | Hechenbleikner | 23—153 |
| 1,367,993 | 2/1921 | Stahl | 23—153 X |
| 1,938,533 | 12/1933 | Penfield | 23—153 |
| 2,833,628 | 5/1958 | Molstad | 23—205 |
| 3,024,086 | 3/1962 | Cines | 23—153 X |

MAURICE A. BRINDISI, *Primary Examiner.*